United States Patent [19]

Apel

[11] 3,858,099
[45] Dec. 31, 1974

[54] SWITCHING ARRANGEMENT FOR A SYNCHRONOUS MOTOR

[76] Inventor: Konstantin Apel, D-7758 Meersburg, Lehrenweg 8, Meersburg, Germany

[22] Filed: May 16, 1972

[21] Appl. No.: 253,800

[30] Foreign Application Priority Data
May 19, 1971 Switzerland................ 7353/71

[52] U.S. Cl................ 318/162, 318/178, 318/227, 318/245
[51] Int. Cl. ............................................ H02p 5/00
[58] Field of Search ...... 318/245, 345, 341, DIG. 1, 318/443, 227, 166, 178, 179, 180, 162, 246; 323/22 SC

[56] References Cited
UNITED STATES PATENTS
3,551,768 12/1970 Lagier................................ 318/245
3,466,521 9/1969 Lagier................................ 318/245

Primary Examiner—B. Dobeck
Attorney, Agent, or Firm—Watson, Cole, Grindle & Watson

[57] ABSTRACT

A synchronous motor is controlled in response to transducer signals by a switching circuit comprising a series connected diode and capacitor connecting the synchronous motor to a power source. A thyristor is connected in parallel to the series connection of the diode, capacitor, and synchronous motor so that the motor is started by the capacitor during the half cycle of the power source in which the diode is blocked and, conversely, the motor is shut off during the half cycles of the power source in which the diode is conducting. The thyristor is controlled so that the synchronous motor drives a program disc step-by-step in accordance with the transducer signals. The thyristor control circuit includes a transistor actuated by a bridge circuit in which the transducer is connected.

6 Claims, 14 Drawing Figures

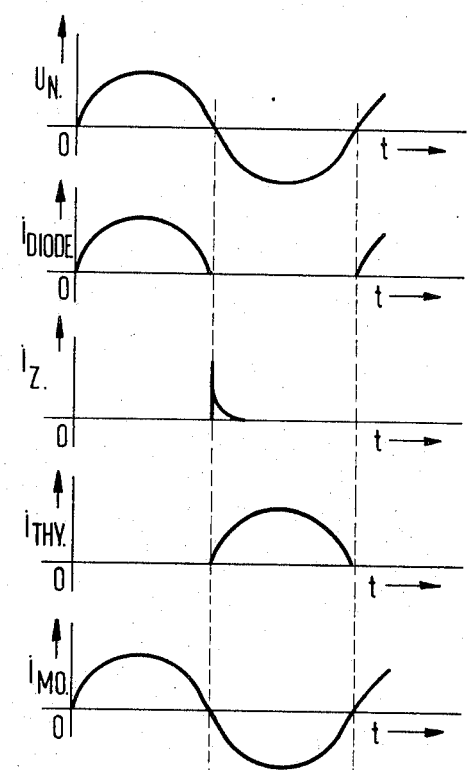
Fig. 3a
Fig. 3b
Fig. 3c
Fig. 3d
Fig. 3e
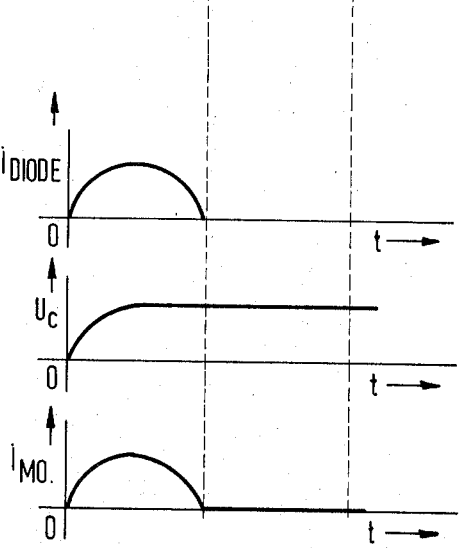
Fig. 4a
Fig. 4b
Fig. 4c

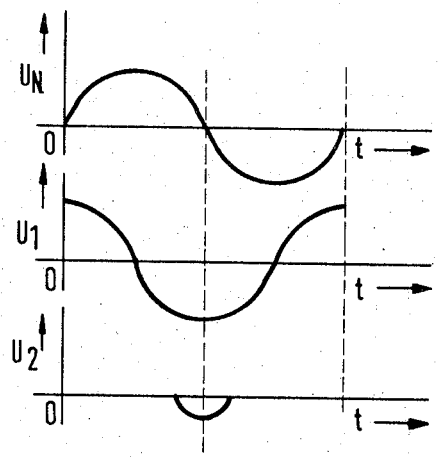
Fig. 5a
Fig. 5b
Fig. 5c
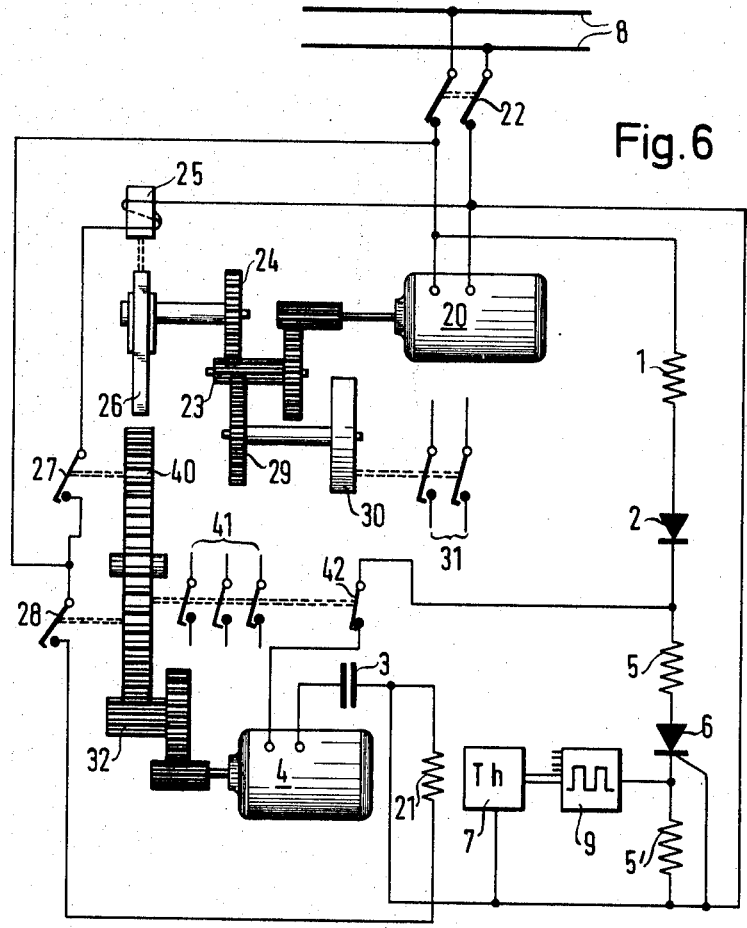
Fig. 6

SWITCHING ARRANGEMENT FOR A SYNCHRONOUS MOTOR

The invention relates to a switching arrangement with semiconductors for a synchronous motor.

In the case of program switches for washing machines, dishwashers or driers, small synchronous motors are used for operation of the switching means. The turning on and off of these motors, as a rule, is accomplished with the aid of relays or simple mechanical contacts, which, however, then are subject to corresponding wear. Thermostats provided to control the program switching gear, as used for example in washing machines for the measurement of the temperature of the wash or in driers for the measurement of the air temperature, also have a relatively short useful life, since they switch the network voltage directly.

It furthermore is known to switch synchronous motors via Triacs or to supply the half wave of the power source to the motor via a thyristor, while the other half wave of the power source always is connected to the motor via a diode. For use in household appliances, these two last mentioned methods always are disadvantageous in that Triacs are much too expensive for this use and, moreover, they need two firing impulses per cycle. In the case of switching with a thyristor and diode, the synchronous motor is never completely at zero current as it is fed with half waves and produces — since it never is entirely at zero current — considerable noise.

It is the object of the present invention to create a switching arrangement for a synchronous motor, especially for use in a program switch, which is built up simply and in a cost saving manner and which, as much as possible, does not require too expensive semiconductors but which can supply the motor with full wave power from the power source. Another object is to operate a synchronous motor in such a way that it will be completely at zero current during stoppage. A further object is to provide control of the starting equipment in accordance with an input signal which originates, for example, from a thermostat.

The features of the invention, as compared to known arrangements, are advantageous in that a fully electronic arrangement can be made that is not subject to any wear. Also, the apparatus can be constructed at a favorable price on the basis of the use of simple semiconductors. The synchronous motor in the case of shutdown remains completely at zero current.

The invention will be explained on the basis of embodiments given by way of example and with the aid of drawings.

Figure 1:
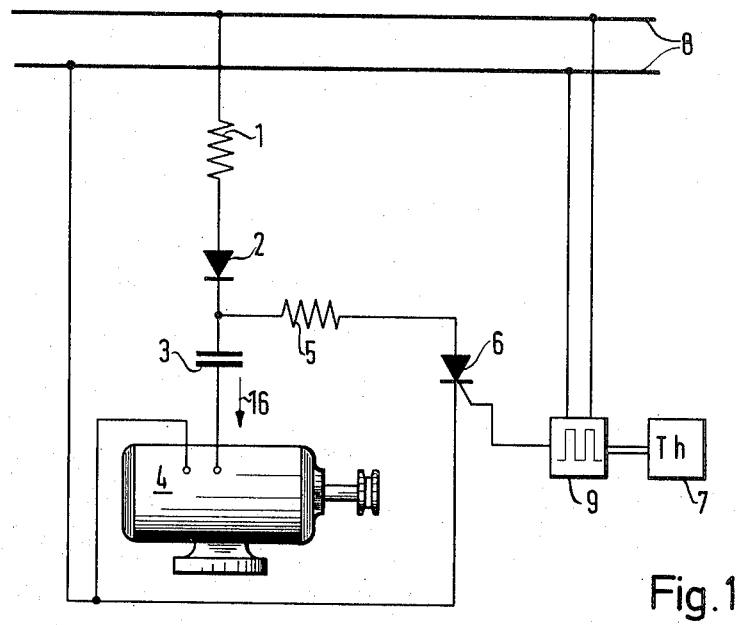
FIG. 1 shows an embodiment by way of example in which the switching arrangement is controlled by a thermostat.
Figure 2:
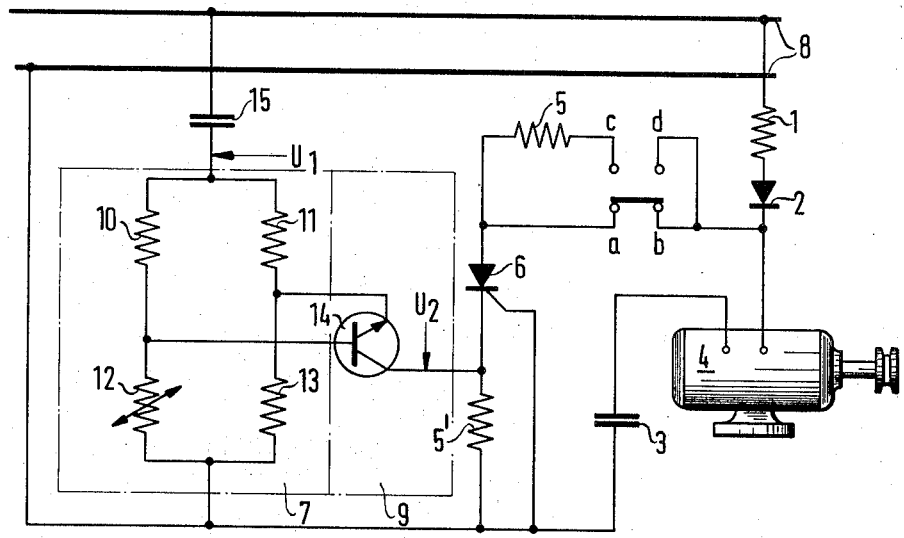
FIG. 2 shows another embodiment by way of example, in which the thermostat is made in the form of a bridge circuit.

FIGS. 3a – e show various voltage or current characteristics of the embodiment according to FIG. 1 for the running motor;

FIGS. 4a – c show various voltage and current characteristics of the embodiment according to FIG. 1 in the case wherein the motor is shut down;

FIGS. 5a – c show various voltage characteristics of the embodiment according to FIG. 2; and FIG. 6 shows a practical example of the object of the application in a program switch.

A synchronous motor 4 (FIG. 1) is connected unilaterally and directly to a power source 8 and by another connection it is connected to the power source by a capacitor 3, a diode 2 and a resistor 1. A series connection consisting of a thyristor 6 and the resistor 5 is parallel to the series connection consisting of capacitor 3 and synchronous motor 4. Thyristor 6 is started by starting circuit 9. With the shutdown of synchronous motor 4, thyristor 6 always remains blocked. As soon as the circuitry is connected to power source 8, a current which charges capacitor 3 flows through the motor for a very short time. From the time at which the charging of capacitor 3 is completed, the motor remains at zero current.

When synchronous motor 4 is to run, thyristor 6 is always started in the embodiment according to FIG. 1 at the beginning of the negative half wave of the power source. During the positive half wave of the power source, on the other hand, it remains blocked (FIGS. 3a – 3d). Let it be assumed that at the beginning of the process capacitor 3 is charged. At the first negative half wave, diode 2 is blocked while thyristor 6 is conductive (FIGS. 3b, 3c and 3d). Therefore, capacitor 3 is discharged via synchronous motor 4 and thyristor 6. At the same time, current flows from capacitor 3 in the direction of arrow 16. During the positive half wave, thyristor 6 is not started, and is therefore blocked (FIG. 3d). Diode 2, however, is open during this time (FIG. 3b). Capacitor 3 therefore again is charged via synchronous motor 4. At the same time, the current flows counter to the direction of arrow 16. On the basis of the steps described, alternating current flows through synchronous motor 4. By suitable selection of the capacitance of capacitor 3 (for example resonance with the motor inductance), the current can be kept almost sinusoidally shaped. Resistors 1 and 5 merely serve the purpose of limiting the current in case thyristor 6 starts as a result of a failure during the positive half wave of the power source.

In the case of a desired shutdown of motor 4, thyristor 6 always remains blocked. Diode 2 opens during the first positive half wave of the power source (FIG. 4a). At the beginning of shutdown of the motor, a short surge current flows through the motor (FIG. 4c), which leads to the charging of capacitor 3. After the charging of capacitor 3 is completed, the current through the motor is zero (FIG. 4c). The voltage at the capacitor 3 has the characteristic shown in FIG. 4b.

Another embodiment by way of example will be explained on the basis of FIG. 2. Thermostat 7 indicated in FIG. 1 is represented in this case by a bridge circuit which is composed of the resistors 10, 11, 12 and 13. At the same time, resistor 12 represents a temperature dependent sensor which is formed, for example, by an NTC resistor. The bridge is connected to a voltage $u_1$ which is tapped via a capacitor 15 from power source 8. Since voltage $u_1$, for example in the case of a 220 V source, amounts to only about 10 V, the capacitance resistance, relative to the total resistance of the bridge, must be high enough that voltage $u_1$ is phase displaced by almost 90° with reference to the power source voltage.

Whenever the temperature dependent resistor 12 (FIG. 2) is heated, a transistor 14 forming the actual starting circuit 9 starts to conduct. Transistor 14 always at first conducts when the AC voltage $u_1$ reaches its negative maximum. This — as becomes clear from FIGS. 5a, 5b and 5c — is always the case at the zero-axis crossing of the power source voltage.

Whenever transistor 14 is conductive, a negative voltage develops at one resistor 5'. This voltage starts the thyristor correctly at the beginning of the negative half wave of the power supply voltage. Therefore, synchronous motor 4 can run. Resistor 5' at the same time can be a current limiting resistor. In this case switch contacts a-b remain closed. In case a resistor 5 is used for the additional limiting of the current, switch contacts a-b remain opened and switch contacts c-d are closed. Resistors 5', 1 or resistors 5, 1, or resistor 5' and resistors 5, 1 together, represent an over-all resistance to limit the current. It will be effective to apply half the resistance value to each of the two resistors 1, 5 or 1, 5' or resistor 1 and resistors 5 + 5', which value is necessary to limit the current. In this case the same charging and discharging current of capacitor 3 is achieved.

The apparatus of FIG. 6 illustrates a special application of the embodiment according to FIG. 2. A cam disc 40 of a program switch is turned step-by-step in accordance with successive program steps. For this purpose it will operate various program contacts 42, 27, 28 and 41. The step-by-step conveyance of cam disc 40 takes place, for example, via an eccentrically driven thrust— or pull-pawl 26. The cam itself for this pawl is driven via gearing 23 or 24 by a continuously running motor 20. Motor 20 takes its current via a power switch 22 from power source 8. An additional cam disc 30, which operates reversing contacts 31, is driven for example in a washing machine via the entire gearing and simultaneously via an additional gearing 29.

In the program there still is a second motor, which, in the present example, is a synchronous motor 4. The latter is supposed to move the cam disc 40 — possibly via additional gears 32 — so quickly that several program steps can be carried out one after the other. In the case of the embodiment given by way of example according to FIG. 6, the application of the apparatus in accordance with the invention is to be used for the purpose of continuing to turn cam disc 40 at high speed on the basis of a signal delivered by thermostat 7 — approximately at the time that the washing machine reaches the temperature set for the wash. This is accomplished in the following manner. During heating of the wash, a magnet 25 receives current via a program dependent contact 27 and keeps the conveying pawl 26 from engaging with the teeth of cam disc 40. Another program dependent contact 28, switching a heat resistor 21, likewise is closed during this time. As soon as thermostat 7 reports a sufficient temperature to the starting arrangement 9, the thryistor is started in the manner described above and synchronous motor 4 can turn. At the same time, another contact 42, operated by cam disc 40, must be closed. Synchronous motor 4 now turns until the program dependent contact 42 is opened by cam disc 40. In this manner cam disc 40 is moved to the next desired program position.

Other signaling devices, besides the thermostat 7, can be used via corresponding signal inputs for the starting circuit 9.

What is claimed is:

1. A driving circuit for controlling a synchronous motor, comprising:
   an a.c. power source;
   a capacitor and diode connected in series with the motor winding of said synchronous motor to said power source;
   a thyristor connected in parallel with said capacitor and motor winding; and
   means for controlling said thyristor to drive said synchronous motor only during the half cycles of said a.c. source during which said diode is blocked.

2. A driving circuit as in claim 1 further comprising a charging resistor and a discharging resistor respectively connected to the anode and cathode of said thyristor.

3. A driving circuit as in claim 1 wherein said means for controlling includes a thermostat for further controlling said thyristor during the half cycles of said AC source during which said diode is blocked.

4. A driving circuit as in claim 3 further comprising a program switch including a cam roller driven by said synchronous motor.

5. A driving circuit as in claim 4 wherein said means for controlling further includes a transistor actuated by said thermostat to control said thyristor.

6. A driving circuit as in claim 5 wherein said means for controlling further includes a bridge circuit for actuating said transistor and said thermostat constitutes one arm of said bridge circuit.

* * * * *